(12) United States Patent
Kato

(10) Patent No.: US 10,035,228 B2
(45) Date of Patent: Jul. 31, 2018

(54) WORKING MACHINE

(71) Applicant: AMADA MACHINE TOOLS CO., LTD., Kanagawa (JP)

(72) Inventor: Masanao Kato, Kanagawa (JP)

(73) Assignee: AMADA MACHINE TOOLS CO., LTD., Kanagawa (JP)

( * ) Notice: Subject to any disclaimer, the term of this patent is extended or adjusted under 35 U.S.C. 154(b) by 0 days.

(21) Appl. No.: 15/515,800

(22) PCT Filed: Aug. 31, 2015

(86) PCT No.: PCT/JP2015/074614
§ 371 (c)(1),
(2) Date: Mar. 30, 2017

(87) PCT Pub. No.: WO2016/056328
PCT Pub. Date: Apr. 14, 2016

(65) Prior Publication Data
US 2017/0304972 A1    Oct. 26, 2017

(30) Foreign Application Priority Data
Oct. 9, 2014    (JP) .................................. 2014-207737

(51) Int. Cl.
*B23P 23/02*    (2006.01)
*B23B 11/00*    (2006.01)
(Continued)

(52) U.S. Cl.
CPC .............. *B23Q 1/626* (2013.01); *B23C 1/002* (2013.01); *B23Q 1/012* (2013.01); *B23B 3/065* (2013.01);
(Continued)

(58) Field of Classification Search
CPC . Y10T 409/307728; Y10T 409/308288; B23C 1/002; B23Q 1/626; B23Q 1/621;
(Continued)

(56) References Cited

U.S. PATENT DOCUMENTS 3,066,782 A * 12/1962 Olton ........................ B23C 3/16
192/142 R
6,068,431 A *  5/2000 Line ........................ B23Q 1/012
409/202
(Continued)

FOREIGN PATENT DOCUMENTS

CN    201415278 Y  *  3/2010
DE    19702673 A1  *  7/1998
(Continued)

OTHER PUBLICATIONS

Machine Translation of CN-201415278-Y, which CN '278 was published Mar. 2010.*
(Continued)

*Primary Examiner* — Erica E Cadugan
(74) *Attorney, Agent, or Firm* — Greenblum & Bernstein, P.L.C.

(57) ABSTRACT

In a working machine, left and right side walls are erected on a bed, a forward/backward saddle is movable in forward/backward directions, left and right sides of the forward/backward saddle are movably supported with the left and right side walls, a forward/backward drive device is arranged on the left and right side walls, to move the forward/backward saddle in the forward/backward directions, a left/right saddle is arranged on the forward/backward saddle and movable in left/right directions, a left/right drive device is arranged on the forward/backward saddle on each of forward/backward sides of the left/right saddle, to move the left/right saddle in the left/right directions, an up/down slider is movable up and down and arranged on the left/right (Continued)

saddle, a lower portion of the up/down slider is provided with a processing head to which a processing tool for processing a work set on the bed is removably and replaceably attached.

7 Claims, 6 Drawing Sheets

(51) Int. Cl.
    *B23C 1/00*     (2006.01)
    *B23C 1/14*     (2006.01)
    *B23Q 1/01*     (2006.01)
    *B23Q 1/62*     (2006.01)
    B23C 1/12     (2006.01)
    B23B 3/06     (2006.01)

(52) U.S. Cl.
    CPC ............... *B23C 1/12* (2013.01); *B23C 1/14* (2013.01); *B23Q 1/017* (2013.01); *B23Q 2701/02* (2013.01); *B23Q 2701/025* (2013.01); *B23Q 2701/06* (2013.01); *Y10T 29/5114* (2015.01); *Y10T 409/308288* (2015.01)

(58) Field of Classification Search
    CPC .... B23Q 1/012; B23B 39/006; B23K 37/0235
    USPC .................................................. 409/202, 212
    See application file for complete search history.

(56) References Cited

U.S. PATENT DOCUMENTS

| | | | | |
|---|---|---|---|---|
| 6,254,317 | B1* | 7/2001 | Chang | B23Q 1/012 409/212 |
| 6,428,453 | B1* | 8/2002 | Hoppe | B23Q 1/012 409/202 |
| 7,273,335 | B2* | 9/2007 | Furuhashi | B23Q 1/012 409/202 |
| 7,401,412 | B2* | 7/2008 | O'Connor | B23Q 1/012 33/1 M |
| 7,767,932 | B2* | 8/2010 | Zeygerman | B23K 26/0884 219/121.78 |
| 9,684,298 | B2* | 6/2017 | Frascati | B23C 1/002 |
| 9,757,832 | B1* | 9/2017 | Chiu | B23Q 1/012 |
| 2004/0090126 | A1 | 5/2004 | Hsu et al. | |
| 2006/0270540 | A1 | 11/2006 | Takayama et al. | |
| 2006/0291971 | A1* | 12/2006 | Tanoue | B23Q 1/012 409/202 |
| 2008/0087128 | A1* | 4/2008 | Garner | B23Q 1/012 74/490.09 |
| 2009/0064832 | A1* | 3/2009 | Caretta | B23Q 1/012 83/76.7 |
| 2009/0067944 | A1* | 3/2009 | Motta | B23Q 1/012 409/202 |
| 2013/0320781 | A1 | 12/2013 | Hosaka | |
| 2014/0020524 | A1 | 1/2014 | Yang et al. | |

FOREIGN PATENT DOCUMENTS

| | | |
|---|---|---|
| DE | 10139296 | 3/2003 |
| EP | 458686 | 11/1991 |
| EP | 1166953 A2 * | 1/2002 |
| JP | 2001-269827 | 10/2001 |
| JP | 2002-200534 | 7/2002 |
| JP | 2006-326740 | 12/2006 |
| JP | 2007-044771 A * | 2/2007 |
| JP | 4410002 B2 | 11/2009 |
| JP | 2014-18956 | 2/2014 |
| WO | 2012/108519 | 8/2012 |

OTHER PUBLICATIONS

Search Report issued in International Patent Application No. PCT/JP2015/074614, dated Oct. 13, 2015.

* cited by examiner

FIG. 6

Embodiment Wherein a Respective Up/Down Drive Device is Arranged on Each of Forward and Backward Sides of the Up/Down Slider

WORKING MACHINE

TECHNICAL FIELD

The present invention relates to a working machine such as a machining center, and particularly, to a working machine capable of moving a movable member, which is movably provided for the working machine, by driving the center of gravity of the movable member.

BACKGROUND ART

Among conventional machining centers, there is one having a column left/right movably erected on a base, a slider up/down movably provided for the column in a cantilever style, and a slider with a spindle head forward/backward movably provided for the slider in a cantilever style (refer to, for example, Japanese Patent Application Publication No. 2002-200534).

According to this kind of configuration, a drive device for moving the column is arranged on the base and a drive device for up/down moving the slider is arranged on the column. Namely, in the machining center of the above-mentioned configuration, the gravity center position of a movable body such as the slider is greatly distanced from the drive device thereof. There is a problem, therefore, that vibration easily occurs at the time of acceleration or deceleration to move and position the movable body by the drive device.

With that, a technique has been proposed to arrange a drive device on each side of the gravity center position of a movable body and move the movable body by driving the same at the center of gravity thereof with a drive source center being positioned in the vicinity of the center of gravity of the movable body (refer to, for example, Patent Literatures 1, 2, and 3).

Configurations mentioned in the Patent Literatures 1 and 2 each arrange a ball screw serving as a drive device on each side of a movable body, to reciprocate the movable body. A configuration mentioned in the Patent Literature 3 arranges a linear motor as a drive device on each side of a movable body.

The configurations mentioned in the Patent Documents 1 to 3 each arrange the drive device on each side of the gravity center position of the movable body, and therefore, may drive the movable body at the center of gravity thereof.

PRIOR ART DOCUMENTS

Patent Documents

Patent Document 1: Japanese Patent Publication No. 4410002
Patent Document 2: Japanese Patent Application Publication No. 2006-326740
Patent Document 3: Japanese Patent Application Publication No. 2001-269827

SUMMARY OF THE INVENTION

However, the gravity center position of the movable body is not necessarily contained within a plane (for example, a plane containing the whole length of an axial center of the ball screw) that contains the drive devices arranged on each side of the movable body and is in parallel with directions in which the movable body is moved by the drive devices. Namely, there will be a case that the gravity center position of the movable body greatly deviates in a direction orthogonal to the above-mentioned plane. In this case, there will be a problem that, when acceleration or deceleration is produced to move and position the movable body, the movable body vibrates (fluctuates).

The present invention has been made in consideration of the above-mentioned situations.

An object thereof is to provide a working machine that sets a drive source center at a gravity center position or a position in the vicinity of the gravity center position, to realize the suppressing of vibration of a left/right saddle compared to driving not at the center of gravity.

To solve the above-mentioned problems, the present invention provides a working machine including left and right side walls erected on a bed, a forward/backward saddle movable in forward/backward directions, left and right sides of the forward/backward saddle being movably supported with the left and right side walls, a forward/backward drive device arranged on the left and right side walls, to move the forward/backward saddle in the forward/backward directions, a left/right saddle arranged on the forward/backward saddle and movable in left/right directions, a left/right drive device arranged on the forward/backward saddle on each of forward/backward sides of the left/right saddle, to move the left/right saddle in the left/right directions, an up/down slider movable up and down and arranged on the left/right saddle, a lower portion of the up/down slider being provided with a processing head to which a processing tool for processing a work set on the bed is removably and replaceably attached, and an up/down drive device arranged on the left-right saddle on each of left and right sides or forward and backward sides of the up/down slider, to move the up/down slider up and down. The working machine is characterized in that the left/right drive devices arranged on the forward and backward sides of the left/right saddle are at different levels.

Another characteristic of the present invention is that, between the left/right drive devices arranged on forward and backward sides of the left/right saddle, the left/right drive device on the backward side is arranged lower than the left/right drive device on the forward side, the left/right drive device on the forward side is arranged at a position higher than a gravity center position of the left/right saddle, and the left/right drive device on the backward side is arranged at a position lower than the gravity center position of the left/right saddle.

Another characteristic of the present invention is that the left/right drive device on the forward side is arranged at a position higher than a gravity center position of the left/right saddle assumed when the up/down slider is uppermost ascended and the left/right drive device on the backward side is arranged at a position lower than a gravity center position of the left/right saddle assumed when the up/down slider is lowermost descended.

Another characteristic of the present invention is that a gravity center position of the up/down slider is set on a front side of an up/down drive source center of the up/down drive device for moving the up/down slider up and down.

Another characteristic of the present invention is that the gravity center position of the left/right saddle assumed when the up/down slider is uppermost ascended is higher than a left/right drive source center position of the left/right drive devices for moving the left/right saddle in the left/right directions and the gravity center position of the left/right saddle assumed when the up/down slider is lowermost descended is lower than the left/right drive source center position of the left/right drive devices.

According to the present invention, the left/right drive devices arranged on the forward and backward sides of the left/right saddle are at different levels, and therefore, a plane that connects the left/right drive devices on the forward and backward sides to each other is a slanted plane. Accordingly, it is easy to form a configuration in which the gravity center position of the left/right saddle is positioned on or close to the slanted plane.

As a result, the gravity center position or a position close to the gravity center position can serve as a drive source center. Namely, the moving and positioning of the left/right saddle is achievable by driving it at the center of gravity thereof. This enables the suppressing of vibration of the left/right saddle compared to driving the same not at the center of gravity.

BRIEF DESCRIPTION OF DRAWINGS

FIG. 6 is a schematic representation of an embodiment wherein a respective up/down drive device is arranged on forward and backward sides of the up/down slider.

DESCRIPTION OF EMBODIMENTS

Hereunder, embodiments of the present invention will be explained with reference to the drawings.

Figure 1:
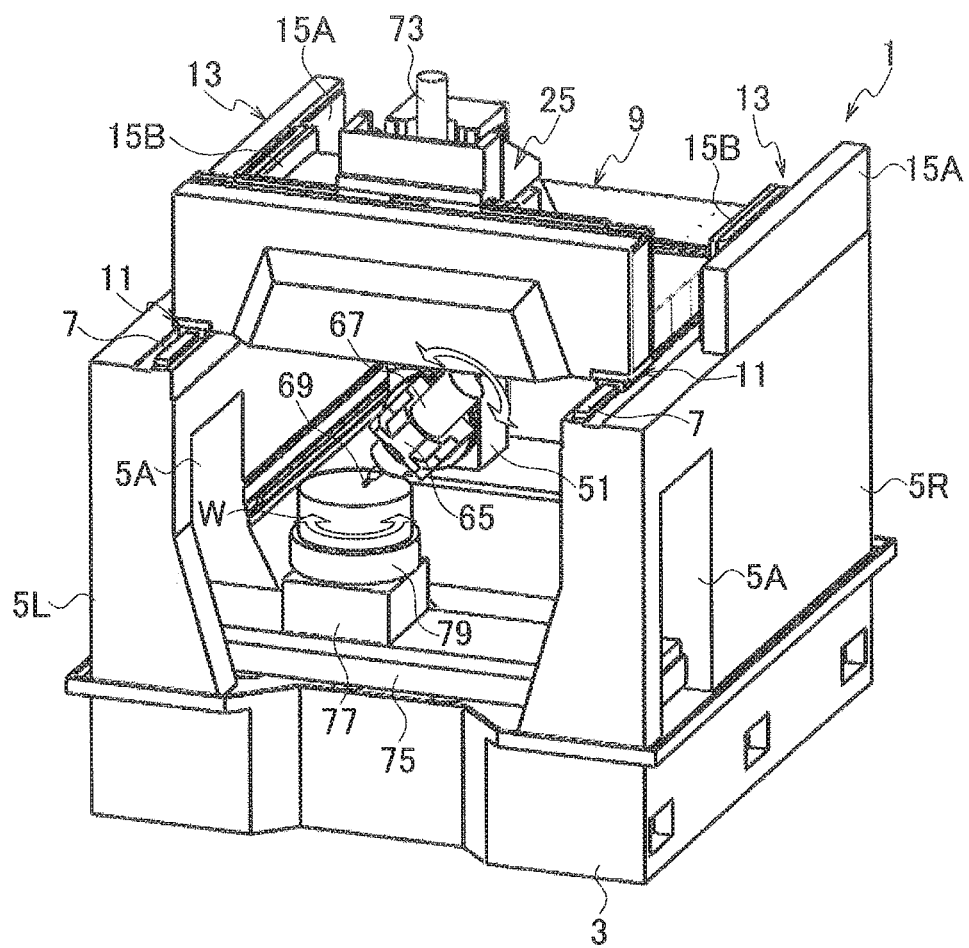
FIG. 1 is an explanatory perspective view showing a general configuration of a working machine according to an embodiment of the present invention.

FIG. 1 is an explanatory perspective view showing a general configuration of a working machine according to an embodiment of the present invention.

As shown in FIG. 1, the working machine 1 according to the embodiment of the present invention has a bed 3. Integrally erected on the bed 3 are left and right side walls 5L and 5R that are separated from each other in a left/right direction (X-axis direction) and are elongated in a forward/backward direction (Y-axis direction).

On the left and right side walls 5L and 5R, guide rails 7 are laid in the forward/backward direction. On the guide rails 7, a forward/backward saddle 9 is supported to be movable in forward/backward directions. When seen from above, the forward/backward saddle 9 has a quadrangle shape. At four corners, i.e., forward, backward, left, and right corners, the forward/backward saddle 9 is integrally provided with slide members 11 movably engaging with the guide rails 7.

At left-right symmetrical positions on the left and right side walls 5L and 5R, forward/backward drive devices 13 are arranged to move and position the forward/backward saddle 9. The forward/backward drive devices 13 are formed with linear motors. Stators 15A of the linear motors are arranged on the left and right side walls 5L and 5R and are extended in the forward/backward direction. Corresponding to the stators 15A, movable elements 15B are arranged on left and right sides of the forward/backward saddle 9.

With this configuration, the linear motors of the forward/backward drive devices 13 are driven to move and position the forward/backward saddle 9 in the forward/backward directions with respect to the bed 3. At this time, the linear motors 13 are arranged at the left-right symmetrical positions, and therefore, a forward/backward drive source center O1 (refer to FIG. 2) to drive the forward/backward saddle 9 is on a horizontal plane H1, which connects up/down directional centers of the left/right linear motors 13 to each other, and is at a left/right directional center.

Here, if the gravity center position of the forward/backward saddle 9 agrees with the position of the forward/backward drive source center O1, or if the gravity center position is close to the drive source center O1, it is possible, as will be explained later, to more effectively suppress vibration that may occur during acceleration and deceleration to move the forward/backward saddle 9 forward and backward.

Figure 3:
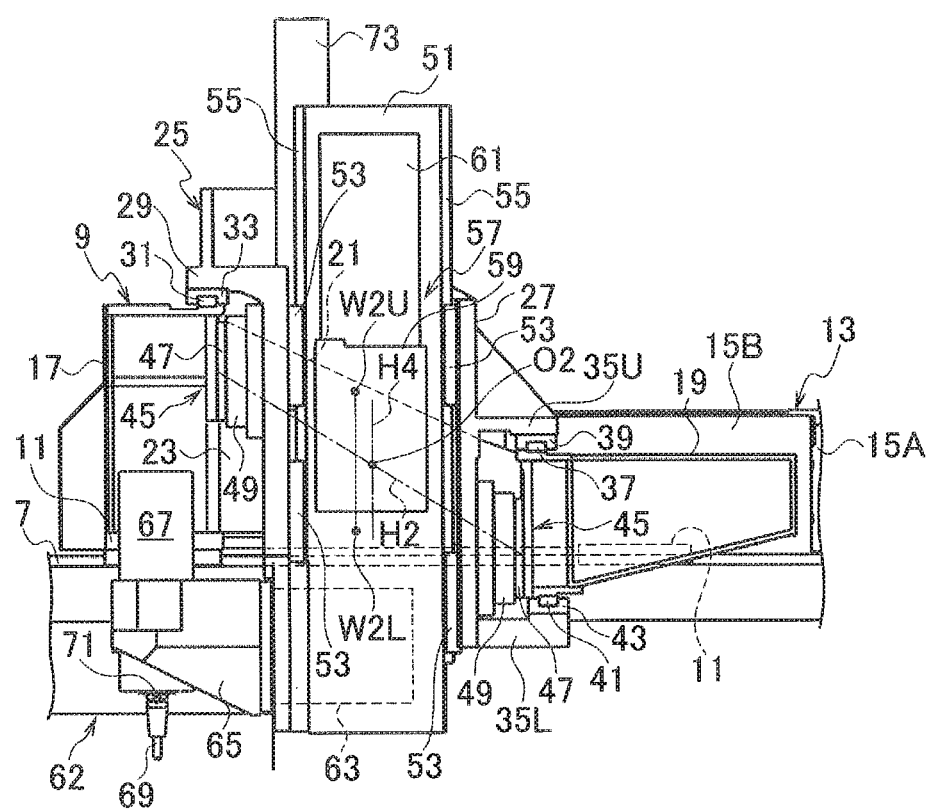
FIG. 3 is an explanatory sectional side view showing an essential portion of the working machine shown in FIG. 1.

As shown in FIG. 3, the forward/backward saddle 9 has an erected forward frame 17 having a box shape and a box-like backward frame 19 that is horizontal and has a height substantially equal to a height of a lower portion of the forward frame 17. The backward frame 19 may be arranged at a further lower position.

Left and right sides of the forward frame 17 and left and right sides of the backward frame 19 are integrally connected to each other with left and right side wall members 21. The movable elements 15B of the linear motors 13 are arranged on side faces of the backward frame 19.

With this configuration, the forward/backward saddle 9 integrally has the forward frame 17, backward frame 19, and left and right side wall members 21, as well as a space 23 surrounded with the forward frame 17, backward frame 19, and left and right side wall members 21.

In the space 23 of the forward/backward saddle 9, a left/right saddle 25 is arranged to be moved and positioned in the left/right direction. In more detail, the left/right saddle 25 is integrally combined with a housing 27, which has a channel shape in plan view, to generally form a cylindrical shape.

Namely, the space 23 integrally contains the housing 27 that is quadrangle and vertically elongated. An upper portion of a front side (left side in FIG. 3) of the cylindrical part including the housing 27 is integrally provided with a forward flange part 29 that projects above the forward frame 17 of the forward/backward saddle 9.

On bottom faces of left and right sides of the forward flange part 29, slide members 33 are arranged to movably engage with a left/right guide rail 31 arranged on a top face of the forward frame 17.

On a backward side of the housing 27 of the left/right saddle 25, upper and lower flange members 35U and 35L are arranged to protrude backward and vertically hold the backward frame 19 of the forward/backward saddle 9.

On the left and right sides of a bottom face of the upper flange member 35U, slide members 39 are arranged to movably engage with a left/right guide rail 37 arranged on a top face of the backward frame 19.

On the left and right sides of a top face of the lower flange member 35L, slide members 43 are arranged to movably engage with a left/right guide rail 41 arranged on a bottom face of the backward frame 19.

With this configuration, the left/right saddle 25 is movable in the left/right directions along the left/right guide rails 31, 37, and 41 with respect to the forward/backward saddle 9.

To move the left/right saddle 25 in the left/right directions, left/right drive devices (linear motors) 45 are arranged on the forward and backward sides of the left/right saddle 25.

At a forward portion of the housing 27, the forward linear motor 45 is provided with a movable element 49 that corresponds to a left/right stator 47 arranged in the space 23 at an upper portion of the forward frame 17. At a backward portion of the housing 27, the backward linear motor 45 is provided with a movable element 49 that corresponds to a left/right stator 47 arranged on the backward frame 19 in the space 23.

As is already understood, the forward linear motor 45 to drive the left/right saddle 25 in the left/right directions is arranged at a higher position than the backward linear motor 45.

Namely, the linear motors 45 serving as the left/right drive devices arranged at forward and backward positions are at different levels.

Accordingly, a plane that connects up/down centers of the forward and backward linear motors 45 to each other is a slanted plane H2. A left/right drive source center O2 to drive the left/right saddle 25 in the left/right directions is on the slanted plane H2 and in the middle between the forward and backward linear motors 45.

Accordingly, if a gravity center position of the left/right saddle 25 agrees with the left/right drive source center O2, or if the gravity center position is close to the left/right drive source center O2, it will be possible to further effectively suppress vibration that may occur during acceleration and deceleration to move the left/right saddle 25 in the left/right directions.

If the forward and backward linear motors 45 are arranged at the same level, the plane that connects the up/down centers of the forward and backward linear motors 45 to each other will be a horizontal plane.

In this case, the horizontal plane deviates in the up/down direction from the left/right drive source center O2. Accordingly, as mentioned above, if the gravity center position agrees with the left/right drive source center O2, or if the gravity center position is close to the left/right drive source center O2, the gravity center position deviates up or down relative to the horizontal plane. Then, vibration may easily occur when the left/right saddle 25 is moved in the left/right directions.

This embodiment, however, arranges the forward and backward linear motors 45 at different levels, to realize the configuration in which the gravity center position of the left/right saddle 25 is close to the left/right drive source center O2.

In the housing 27 of the left/right saddle 25, an up/down slider 51 is arranged to be movable up and down.

Figure 4:
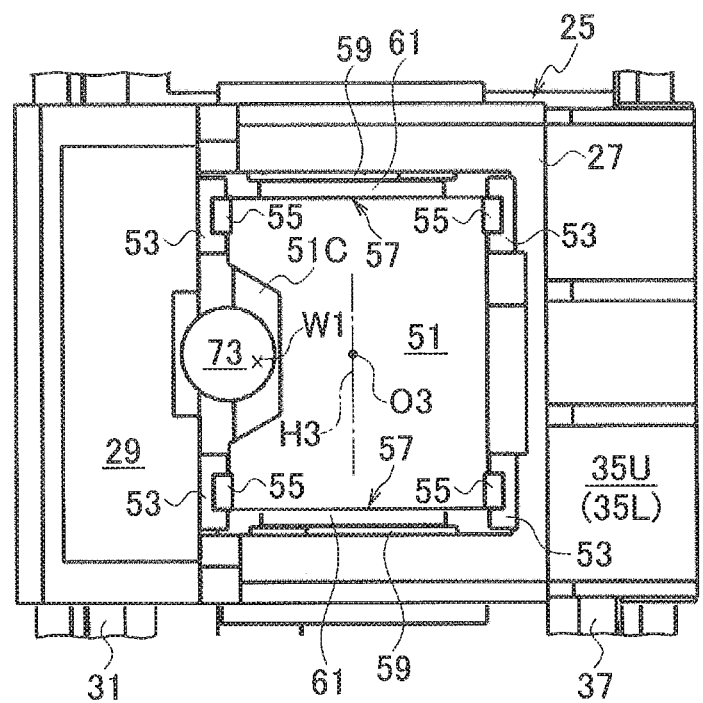
FIG. 4 is an explanatory plan view showing an essential portion of the working machine shown in FIG. 1.
Figure 4:
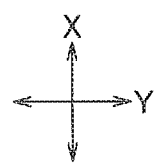

As shown in FIG. 4, the up/down slider 51 substantially has a quadrangle shape when viewed from above. Around each of four corners thereof, an up/down guide rail 55 is integrally formed to slidably engage with a slide member 53 arranged inside the cylindrical portion including the housing 27.

Accordingly, the plurality of slide members 53 restrict movements of the up/down slider 51 in the forward/backward and left/right directions.

To move the up/down slider 51 up and down relative to the left/right saddle 25, an up/down drive device (linear motors) 57 is arranged. More precisely, the linear motors 57 are arranged on the left and right sides of the up/down slider 51, respectively.

Namely, on left and right inner side faces of the housing 27 of the left/right saddle 25, stators 59 of the linear motors 57 are arranged. On left and right side faces of the up/down slider 51, movable elements 61 corresponding to the stators 59 are arranged in the up/down direction.

The left and right linear motors 57 serving as the up/down drive device are arranged in left-right symmetry. An up/down drive source center O3 to drive the up/down slider 51 in the up/down directions is positioned in the left/right middle of a vertical plane H3 that connects forward/backward centers of the linear motors 57. This up/down drive source center O3 is shifted forward from a forward/backward center of the up/down slider 51.

At a lower portion of the up/down slider 51, a processing head 62 (refer to FIG. 3) is arranged to process a work set on the bed 3. Namely, at the lower portion of the up/down slider 51, a motor 63 is arranged.

A rotary shaft (not shown) of the motor 63 is horizontal. Integrally attached to a front end of the rotary shaft is a motor bracket 65 that is arranged on a lower end front face of the up/down slider 51.

This motor bracket 65 constitutes part of the processing head 62. Attached to the motor bracket 65 is a tool motor 67 having a rotary shaft (not shown) oriented in a direction orthogonal to the rotary shaft of the motor. A main rotary shaft of the tool motor 67 is provided with a chuck 71 to which a cutting tool 69 is removably and replaceably attached.

To smoothly move the up/down slider 51 up and down by driving the linear motors 57, the left/right saddle 25 is provided with a balance cylinder 73. As shown in FIG. 4, the balance cylinder 73 is attached to the up/down slider 51 in a recessed part 51C that is formed in front of the left/right middle of the up/down slider 51 (details of the attaching arrangement are not shown).

A piston rod (not shown) movable up and down relative to the balance cylinder 73 is fixed to a bracket (not shown) fixed to the left/right saddle 25.

As is understood from FIG. 3, the motor 63 is arranged at a lower portion of the up/down slider 51. The rotary shaft of the motor 63 is provided with the motor bracket 65 that protrudes forward from the up/down slider 51. To the motor bracket 65, the tool motor 67 is attached.

Accordingly, a gravity center position W1 of the up/down slider 51 is on a forward side of the forward/backward center of the up/down slider 51. The balance cylinder 73 is attached to the up/down slider 51 at a position higher than the gravity center position W1.

With this, a weight including the up/down slider 51, motor 63, tool motor 67, and the like is supported with the balance cylinder 73, so that the linear motors 57 serving as the up/down drive device are able to smoothly drive the up/down slider 51 up and down.

As mentioned above, the up/down slider 51 is moved with the gravity center position W1 of the up/down slider 51 being close to the up/down drive source center O3 and being positioned between the linear motors 57. Namely, the up/down slider 51 is driven at the center of gravity, to further suppress vibration that may occur during acceleration and deceleration to move the same up and down.

The up/down slider 51 moves together with the left/right saddle 25 in the left/right directions and moves up and down relative to the left/right saddle 25. When the up/down slider 51 moves up and down, the gravity center position of the left/right saddle 25 changes up and down.

As a left/right movable body moving in the left/right directions, an overall gravity center position W2 (refer to FIG. 3) of the left/right saddle 25 and up/down slider 51 is close to a vertical plane H4 passing through the left/right drive source center O2 and is restricted within the range of W2U and W2L in the up/down direction.

Namely, the upper gravity center position W2U is restricted to a position lower than the forward linear motor 45 that is positioned at the high level to drive the left/right saddle 25 in the left/right directions. The lower gravity center position W2L is restricted to a position higher than the backward linear motor 45 that is positioned at the low level.

In other words, the overall gravity center position W2 including the left/right saddle 25 and up/down slider 51 is configured not to separate greatly away from the left/right drive source center O2.

Accordingly, even when the forward and backward linear motors 45 are driven to move the left/right saddle 25 in the left/right directions with the up/down slider 51 being uppermost ascended or lowermost descended, the left/right saddle 25 can be driven at the center of gravity to move in the left/right directions. This effectively suppresses vibration that may occur during acceleration and deceleration to move the left/right saddle 25 in the left/right directions.

When the forward/backward saddle 9 is moved forward and backward, the left/right saddle 25 and up/down slider 51 are also moved forward and backward. Accordingly, a gravity center position of the forward/backward movable body that moves forward and backward together with the forward/backward saddle 9 changes to the left, right, up, and down if the left/right saddle 25 is moved in the left/right directions and the up/down slider 51 in the up/down directions. The left, right, up, and down changes of the gravity center position are restricted to the vicinities of the forward/backward drive source center O1 (refer to FIG. 2).

Figure 2:
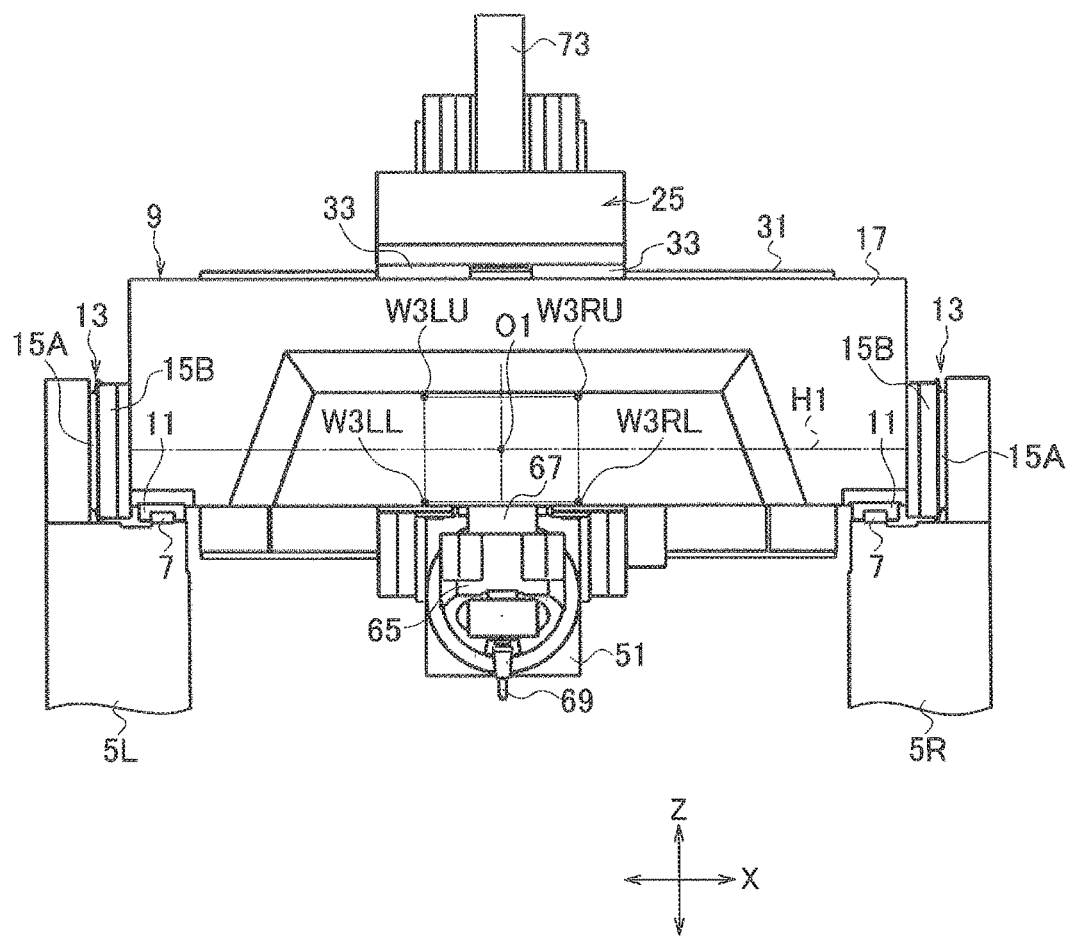
FIG. 2 is an explanatory front view showing an essential portion of the working machine shown in FIG. 1.

Namely, when the left/right saddle 25 is at a rightmost position and the up/down slider 51 at the uppermost position, a gravity center position W3RU is, as shown in FIG. 2, adjacent to the forward/backward drive source center O1 and is restricted within an up/down width of the movable elements 15B of the linear motors 13. When the left/right saddle 25 is at a leftmost position and the up/down slider 51 at the uppermost position, a gravity center position W3LU is at a height position equal to the gravity center position W3RU and is restricted to a left-right symmetrical position.

When the left/right saddle 25 is at the rightmost position and the up/down slider 51 at the lowermost position, a gravity center position W3RL is vertically below the gravity center position W3RU and is restricted substantially to a height position of the left and right slide members 11. When the left/right saddle 25 is at the leftmost position and the up/down slider 51 at the lowermost position, a gravity center position W3LL is vertically below the gravity center position W3LU and is restricted to the same height as the gravity center position W3RL.

Namely, when the left/right saddle 25 moves in the left/right directions relative to the forward/backward saddle 9 and the up/down slider 51 moves up and down relative to the left/right saddle 25, the range of changing gravity center positions W3RU, W3LU, W3RL, and W3LL is restricted not to greatly deviate from the forward/backward drive source center O1.

Accordingly, the forward/backward saddle 9 is always driven at the center of gravity thereof when the same is moved forward and backward. This effectively suppresses vibration to occur during acceleration and deceleration to move the forward/backward saddle 9 forward and backward.

As is understood from the above explanation, the cutting tool 69 arranged at a lower portion of the up/down slider 51 is always driven at the center of gravity in any axial direction when the same is moved in the left/right direction (X-axis direction), forward/backward direction (Y-axis direction), and up/down direction (Z-axis direction).

This results in suppressing vibration that may occur during acceleration and deceleration to move the cutting tool 69 in the X-, Y-, and Z-axis directions. This results in reducing load applied to the guide rails and slide members in the X-, and Z-axis directions, thereby realizing the maintaining of accuracy for a long time.

This configuration sets the forward linear motor 45 higher than the backward linear motor 45, to produce a space under the forward linear motor 45.

As a result, it becomes easy to arrange, within the space, the processing head 62 provided at a lower portion of the up/down slider 51. In other words, a forward protruding length of the processing head 62 from the up/down slider 51 can be minimized.

Further, the backward frame 19 of the forward/backward saddle 9 is lower than the forward frame 17 of the same, to expand an up/down distance of the slide members 53 and improve static rigidity.

The present invention is not limited to the above-mentioned embodiment, and with proper modifications, is achievable in other forms.

Namely, the above-mentioned embodiment forms the forward/backward drive device 13, left/right drive device 45, and up/down drive device 57 with linear motors. Instead of the linear motors, it is possible to employ ball screws that are driven and rotated by servomotors.

According to the configuration shown in FIG. 1, openings 5A are formed in the left/right direction at forward portions of the left and right side walls 5L and 5R, and on the bed 3, a table 75 is extended between the openings 5A. On the table 75, a vertical headstock 77 is arranged. On the vertical headstock 77, a chuck (for example, a magnet chuck) for detachably holding a work W is arranged. The chuck is horizontally rotatable and is able to be indexed and positioned to a required rotation angle.

With this configuration, the cutting tool 69 is able to conduct a cutting process on a required position on a top face of the work W or at a required position on a peripheral face of the work W.

Figure 5:
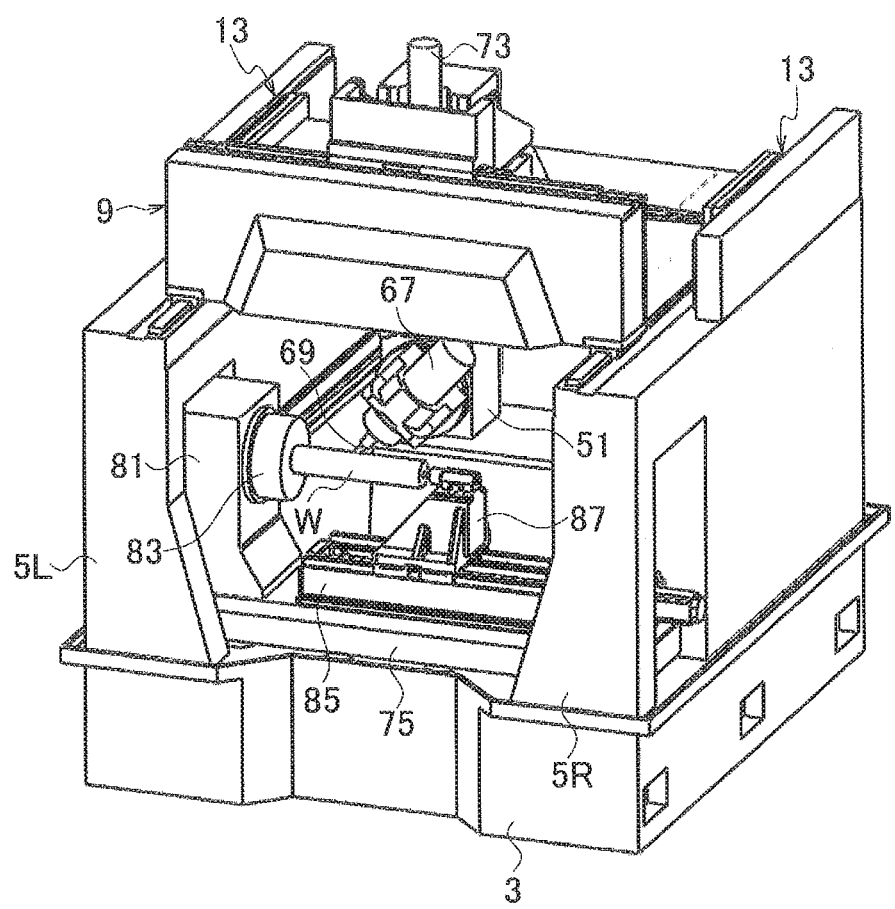
FIG. 5 is an explanatory perspective view showing a working machine according to another embodiment of the present invention.

Instead of this configuration, it is possible, as shown in FIG. 5, to erect a headstock 81 at one side of the table 75, and on the headstock 81, arrange a chuck 83 that is rotatable around a horizontal axis, the chuck horizontally supporting a rod-like work W. On the table 75, a sub-bed 85 is arranged to extend in the left/right direction. On the sub-bed 85, a tailstock 87 or a sub-headstock facing the headstock 81 is arranged to be movable in the left/right directions.

In this way, proper modifications may be made to realize various embodiments.

As is understood from the above explanation, the forward guide rail 31 and backward guide rails 37 and 41 to guide the left/right saddle 25 in the left/right directions are arranged at different levels. In addition, the linear motors 45 serving as the left/right drive devices are arranged in the vicinities of the upper and lower guide rails 31, 37, and 41. As a result, the left/right drive source center O2 is close to the gravity center position of the left/right saddle 25.

As a result, vibration during acceleration and deceleration of the left/right saddle 25 can effectively be suppressed. Also, the structure for driving and guiding the left/right saddle 25 in the left/right directions can be simplified.

INDUSTRIAL APPLICABILITY

According to the present invention, it is possible to provide a working machine that is able to set a drive source center on a gravity center position or on a position close to the gravity center position, to suppress vibration of a left/right saddle compared to driving not at the center of gravity.

The invention claimed is:

1. A working machine including:
   a left side wall and a right side wall, wherein the left side wall and the right side wall are both erected on a bed,
   a forward/backward saddle movable in forward and backward directions, a left side of the forward/backward saddle being movably supported on the left side wall, and a right side of the forward/backward saddle being movably supported on the right side wall,
   a respective forward/backward drive device arranged on each of the left and right side walls, to move the forward/backward saddle in the forward and backward directions,
   a left/right saddle arranged on the forward/backward saddle and movable in left and right directions,
   a respective left/right drive device arranged on the forward/backward saddle on each of a forward and a backward side of the left/right saddle, to move the left/right saddle in the left and right directions,
   an up/down slider movable up and down and arranged on the left/right saddle,
   a lower portion of the up/down slider being provided with a processing head to which a processing tool for processing a work set on the bed is removably and replaceably attached, and
   a respective up/down drive device arranged on the left/right saddle on each of a left and a right side or on each of a forward and a backward side of the up/down slider, to move the up/down slider up and down,
   wherein the left/right drive device arranged on the forward side of the left/right saddle, and the left/right drive device arranged on the backward side of the left/right saddle, are at different levels in the up and down directions.

2. In the working machine as described in claim 1, the left/right drive device that is arranged on the backward side of the left/right saddle is arranged lower than the left/right drive device that is arranged on the forward side of the left/right saddle, the left/right drive device on the forward side of the left/right saddle is arranged at a position higher than a gravity center position of the left/right saddle, and the left/right drive device on the backward side of the left/right saddle is arranged at a position lower than the gravity center position of the left/right saddle.

3. In the working machine as described in claim 2, the left/right drive device on the forward side of the left/right saddle is arranged at a position higher than a gravity center position of the left/right saddle assumed when the up/down slider is uppermost ascended, and the left/right drive device on the backward side of the left/right saddle is arranged at a position lower than a gravity center position of the left/right saddle assumed when the up/down slider is lowermost descended.

4. In the working machine as described in claim 1, a gravity center position of the up/down slider is set on a front side of a center position centered between the up/down drive devices.

5. In the working machine as described in claim 1, a gravity center position of the left/right saddle assumed when the up/down slider is uppermost ascended is higher than a center position centered between the left/right drive devices, and a gravity center position of the left/right saddle assumed when the up/down slider is lowermost descended is lower than the center position centered between the left/right drive devices.

6. In the working machine as described in claim 1, a headstock for rotatably supporting the work is provided on the bed.

7. In the working machine as described in claim 6, a tailstock is provided.

* * * * *